Feb. 10, 1953 E. A. ROCKWELL 2,627,726
POWER UNIT FOR DELIVERING HYDRAULIC POWER
Filed Aug. 15, 1946 2 SHEETS—SHEET 2
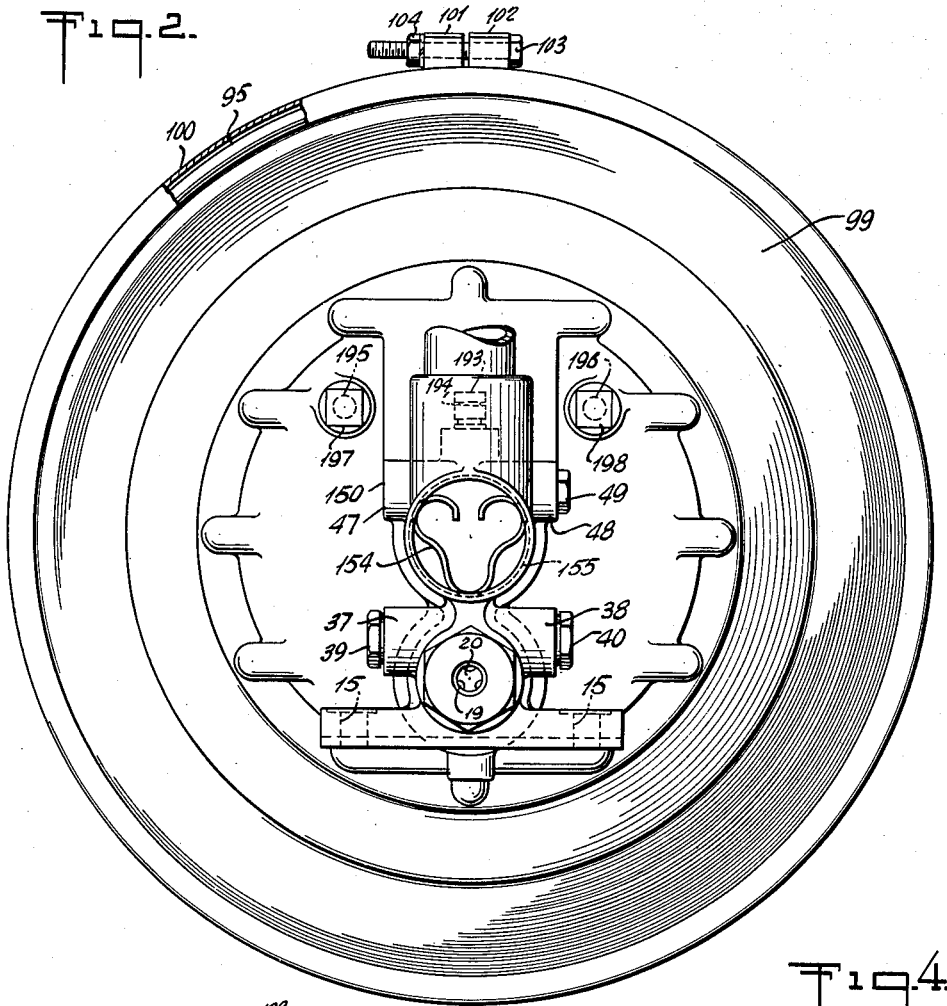
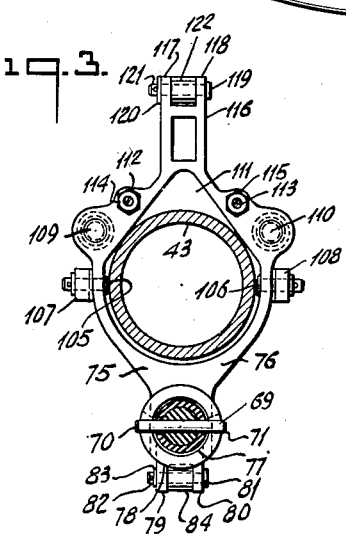
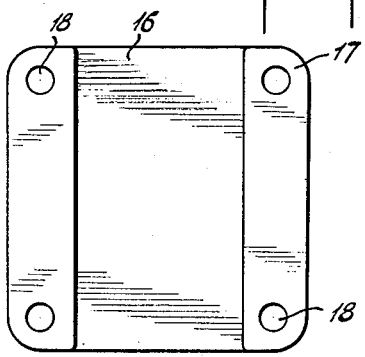
INVENTOR
EDWARD A. ROCKWELL
BY
Arthur Wright
ATTORNEY Patented Feb. 10, 1953

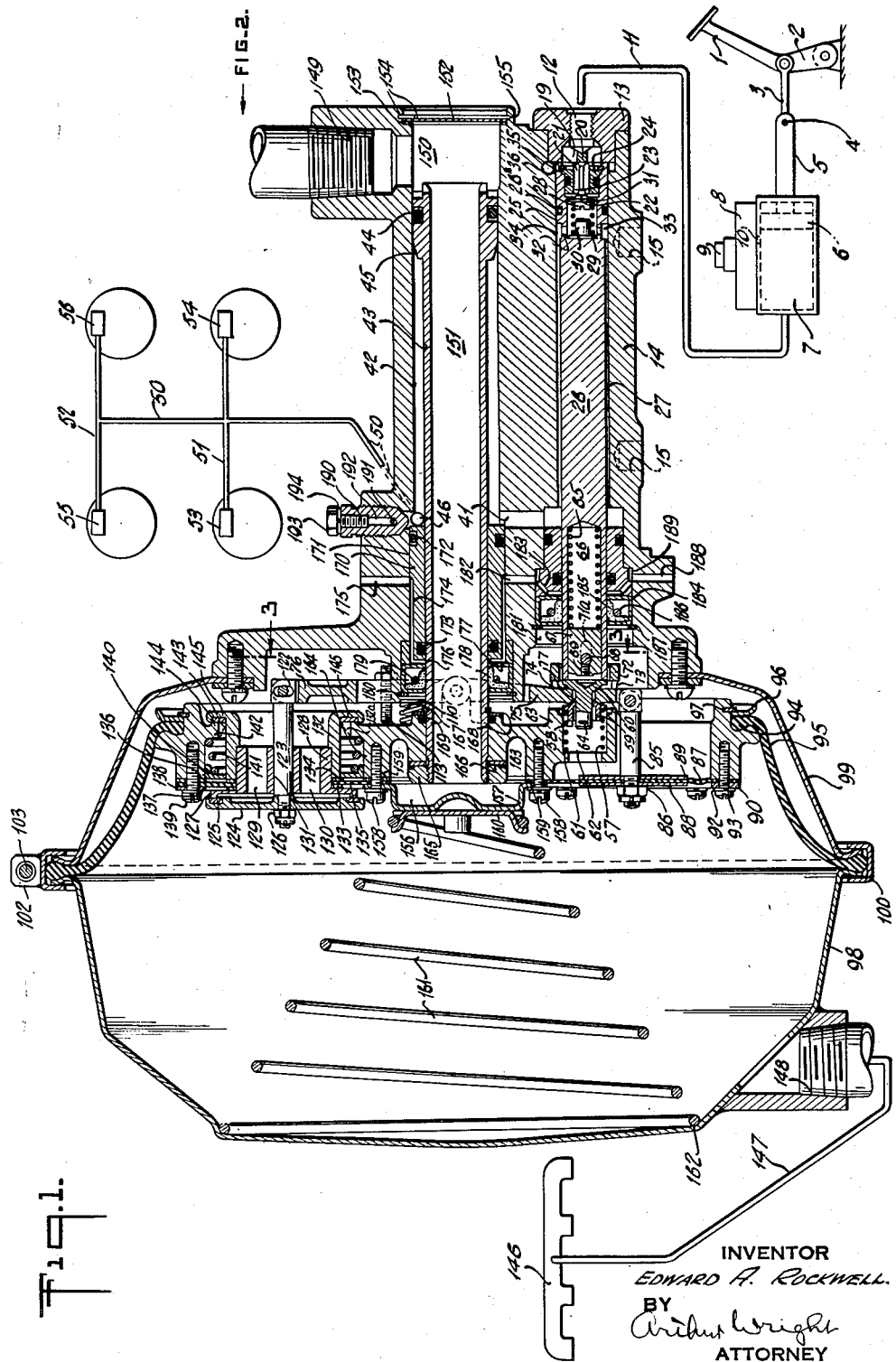

2,627,726

UNITED STATES PATENT OFFICE 2,627,726

POWER UNIT FOR DELIVERING HYDRAULIC POWER

Edward A. Rockwell, Shaker Heights, Ohio

Application August 15, 1946, Serial No. 690,638

19 Claims. (Cl. 60—54.5)

My invention relates particularly to a power unit for applying power thereby to any desired apparatus or device, but which is especially desirable for applying power to automotive accessories, as for instance automobile brakes.

The object of my invention is to provide an apparatus of this character which will effectively provide power wherever desired. Another object is to provide an effective construction in the making of power units so that a source of fluid pressure differing from atmospheric pressure may be utilized for moving a pressure responsive element, as for instance a movable wall, by the pressure differences between said source of fluid pressure and atmospheric air. Another object is to construct the pressure responsive element in such a way as to enable the admitted air to be conducted through a passageway in the movable wall which is provided by means of separable plates for this purpose. Still another object is to provide on the movable wall a pressure-increasing plunger which, preferably, carries an atmospheric air conduit for communicating with the air passageway in the movable wall provided by means of said plates. Further objects of my invention will appear from the detailed description of the same hereinafter.

This invention is an improvement over the invention in my patent upon Power Intensifier Valve, No. 2,398,252, granted April 9, 1946.

While my invention is capable of being carried out in the form of different embodiments thereof, I have shown, by way of example, only one form thereof in the accompanying drawings, in which—

Fig. 1 is a longitudinal vertical section of a power unit made in accordance with my invention, showing the valves in lapped position, which occurs in starting the operation of the power unit after the closing of the vacuum valve and before the opening of the air valve;

Fig. 2 is an end elevation of the same taken in the direction from the right-hand end of Fig. 1;

Fig. 3 is an elevation of a valve operating lever showing a portion of the power unit in section; and Fig. 4 is a plan view of a mounting pad on which the power unit may be mounted in the position shown in Fig. 1.

In the drawings, I have shown a pedal 1 mounted on a fixed pivot 2 having connected thereto a link 3 which is connected by a pivot 4 to a master cylinder piston rod 5 carrying a piston 6, in a master cylinder 7 of the usual construction provided with a reservoir 8 and a vented filling cap 9. In its retracted position, the piston 6 covers a liquid compensation port 10 leading to the reservoir 8 and when the pedal 1 is pressed forwardly it will deliver the hydraulic liquid under the manual pressure through a pipe 11 which leads to a screw-threaded inlet opening 12 in a screw plug 13 carried in one end of a power unit casting 14, which has four screw-threaded holes 15 for attachment of the power unit to a supporting pad or base 16 having supporting ribs 17 provided with holes 18 to receive screws which pass into the holes 15.

The hydraulic liquid received in the inlet opening 12 passes through three inlet ports 19, having a web 20 supporting the same. The web 20 acts as a stop for a fluted liquid cut-off valve rod 21 carrying thereon a conical valve 22 which is arranged to seat on a valve seat 23 on a sleeve 24 provided in a cylindrical opening 25, in a control plunger 26 which is arranged to reciprocate in a control plunger chamber 27, provided in the casting 14. An annular rubber seal 26' is provided around the sleeve 24. An extension 28, on the conical valve 22, acts as a retainer for a helical spring 29 seated at one end on the said conical valve 22 and supported at its other end around a cylindrical projection 30 on the control plunger 26 within a valve chamber 31. The said valve chamber 31 communicates by radial ports 32 having passageways 33 on the control plunger 26 and thence to the interior of the control plunger cylinder 27. The passageway 33 is adjacent to an annular recess 34 located around the control plunger 26. It will be noted, also, that the valve sleeve 24 is held in fixed position in the control plunger 26 by means of a split ring 35 in the opening 25. It will, furthermore, be noted that when the control plunger 26 moves to the left it gives access to a transverse passageway 36 through which connections may be made, if desired, through openings 37 and 38 to any other power units desired to be operated by the liquid from the master cylinder pipe 11, but which are normally closed by screw plugs 39 and 40, respectively.

Prior to the control plunger 26 being moved it will be understood that the valve 22, 23 is unseated by reason of the contact of the valve stem 21 with the web 20 and, consequently, in this position of the parts the liquid from the pipe 11 will pass through the chamber 31, passageways 33 into the chamber 27, and thence by a passageway 41 to a pressure intensifying or power chamber 42 in the casting 14, having arranged reciprocably therein a pressure intensifying or power plunger 43 provided with a peripheral annular seal 44.

The plunger 43 has formed thereon a piston 45. From the cylinder 42 the liquid, which is initially under the manual pressure from the pipe 11, will pass out from the power unit by an outlet passageway 46 leading to either one or both of two outlet ports 47 and 48, one of which may be closed normally by a screw plug 49 and the other of which is connected by a brake pipe line 50, which has branch pipes 51 and 52 leading, respectively, to front brake wheel cylinders 53 and 54 and rear brake wheel cylinders 55 and 56 so as, thus, to set the brakes and apply any initial small amount of braking force, as desired.

Any slight increase of this manual pressure in the pipe 11 from the master cylinder 7 will result in moving the control plunger 26 to the left, thereby seating the valve 22, 23 by the force of the spring 19, thus disconnecting the communication of the manual pressure liquid received in the pipe 11 from being delivered directly to the brake pipe line 50. Thereupon, the control piston 26 is also moved towards the left in opposition to a helical spring 57, one end of which is carried in an annular spring sleeve 58 provided around a projection 59 on a head 60 carried by the end of the control plunger 26. The other end of the helical spring 57 rests against a shoulder 61 in a passageway 62 provided in a diaphragm clamping plate 63. A cotter pin 64 in the end of the projection 59 retains the spring sleeve 58 in place.

The movement of the control plunger 26 in the manner referred to is also made in opposition to a compressed helical spring 65 in a cylindrical recess 66 in the end of the control plunger 26. This spring 65 rests against one face of a small plunger 67 which slides in the recess 66 and in which it is retained by a cross pin 68 secured in fixed position by a set screw 69, ends 70 and 71 of which extend outwardly through slots 71a in the plunger 26 so as to rest against a collar 72 which is formed on the plate 63. This collar 72, furthermore, is arranged so as to provide opposing slots 73 and 74 in the said plate 63 beneath the collar 72 in order to receive an end 75 of a valve lever 76 which has a hole 77 through which the head 60 passes and which has a bifurcated end 78 with ears 79 and 80 to receive a pivot pin 81 secured by a cotter pin 82 and washer 83. The pivot pin 81 passes through a journal 84 on a standard 85, fastened by a nut 86 to a pressure compensating subsidiary flexible diaphragm 87, held thereon by diaphragm clamping plates 88 and 89 through which the standard 85 passes. The periphery of the flexible diaphragm 87 is clamped securely against the main diaphragm plate 63 by means of a ring 90 as well as lock washers 92 and screws 93. The said main diaphragm plate 63, furthermore, has a peripheral recess 94 in order to receive a main flexible diaphragm 95 and which is held in place therein by a main diaphragm clamping ring 96 held in position by a split ring 97. The outer periphery of the main diaphragm 95 is, furthermore, received between casing members 98 and 99, between which it is clamped by a U-shaped clamping member 100 having lugs 101 and 102 on the free ends thereof to receive a bolt 103 fastened in place by a nut 104.

In this way, the valve lever 75 is operated by the movement of the control piston 26 so that the said valve lever, which is pivotally carried by pivot pins 105 and 106 on pivots 107 and 108 formed on the plate 63, is operated against the force of positioning coil springs 109 and 110. The said springs 109 and 110 are located in appropriate recesses between the valve lever 75 and the diaphragm plate 63. Furthermore, it will be noted that the valve lever 76 has a central opening 111 through which the power plunger 43 passes and that the movement of the valve lever 75 is limited by means of stop screws 112 and 113, held in place by lock nuts 114 and 115, cooperating with the face of the plate 63. The upper end of the valve lever 76, furthermore, has a bifurcated end 116 provided with pivot ears 117 and 118 to receive a pin 119 held in place by a washer 120 and cotter pin 121. The said pin 119 is received in slots 122, for self alignment in the ears 117 and 118, at one end of a valve-operating plunger 123, the other end of which carries an outlet or vacuum valve plate 124 provided with a rubber ring valve seat 125 in its inner periphery, and held in place on the plunger 123 by a nut 126. The valve seat 125 cooperates with an annular outlet or vacuum valve element 127 on a valve member 128 provided with longitudinal openings 129 and 130 and a central web 131 through which the valve plunger 123 passes. The valve member 128 is screw-threaded externally to a valve sleeve 132 in such a way that the valve member 128 and the sleeve 132 clamp in place, between annular seals 133 and 134, a flexible valve-supporting diaphragm 135. The outer periphery of the valve diaphragm 135 is clamped between annular seals 136 and 137 by means of a clamping ring 138 and screws 139 carried on the plate 63. It will be noted, furthermore, that the valve sleeve 132 has thereon guide flutings 132a and a spring-retaining ring 140 for retaining in place a conical retracting spring 141, the other end of which rests against a flange 142 on the interior of a transverse passageway 143 in the plate 63. The flange 142 is provided with an inlet or air valve element 144 which cooperates with a rubber valve seat ring 145 carried around the periphery of the valve sleeve 132.

It will be understood that normally, before the control plunger 26 is moved, the vacuum or outlet valve 125, 127 is in open position while the inlet valve 144, 145 is in closed position, thus initially submerging the diaphragm 95 in vacuum, on both sides thereof, which is received from any suitable source as for instance an automobile engine manifold 146 by means of a pipe 147 which leads to a screw-threaded vacuum inlet opening 148 attached to the casing 98.

When, however, upon the movement of the control plunger 26 the valve lever 75 is moved, this will initially close the vacuum valve 125, 127, followed thereafter by the opening of the inlet or air valve 144, 145. This will admit air to the right face of the main flexible diaphragm 95 from an air inlet port or vent 149 on the casting 14, which communicates with a chamber 150 and thence to a longitudinal air passageway 151 in the pressure-increasing or power plunger 43. The end of the chamber 150 is closed by a dust cap 152 held in place against an annular seal 153 by a snap ring 154 carried in a recess 155 in the end of the chamber 150. The air thus admitted into the passageway 151 in the power plunger 43 is thence conveyed to an air passageway 156, of ample size, on the face of the main diaphragm plate 63 and which is formed at this point by means of an air passageway plate 157 secured to the plate 63 by screws 158 against a packing ring 159. The air passage plate 157 also forms a support for a spring plate 160 which receives one end of a conical retracting spring 161, the other end of which rests in a recess 162 on the inner face of the casing 98. The air passageway 156, which can, thus, be readily formed in this manner without requiring the use of unnecessary cores in casting, communicates with an annular channel 163 which conveys the air to the transverse passageway 143 and thence to the inlet valve 144, 145, around a stud 164 in which one of the screws 158 is received. It will, furthermore, be noted that the pressure intensifying plunger 43 is secured to the plate 63 by means of a screw-threaded ring 165 which seats against a packing ring 166, on one face of the plate 63, the plunger 43 being positioned against the other face of the plate 63 by means of a split ring 167, a packing ring 168 and an annular sealing ring 169.

Also, it will be noted that the power plunger 43 is carried in a bushing 170 in a cylindrical recess 171 adjacent to the chamber 42, said bushing 170 having outer and inner annular rubber seals 172 and 173. The bushing 170, furthermore, has an outer venting passageway 174 for the escape of any hydrocarbon vapors to a vent 175 in the casting 14, and said passageway 174 leads to an annular sealing chamber 176 having therein a U-shaped annular sealing ring 177 for holding in place a leather lubricating washer 178 retained in position by an annular coil spring 179. These sealing elements are retained in position in the casting 14 by a split ring 180. It will be noted that this venting system leading from the vent 175 also communicates with a chamber 181 around the control plunger 26 by means of an annular passageway 182 and an inclined passageway 183 so as to be in communication with a sealing means comprising a U-shaped retaining ring 184, a leather lubricating ring 185, a coil retaining spring 186 and a split ring 187, which are constructed, respectively, like the seals located around the power plunger 43. Also, if desired, a vent 188 may be provided in the lower portion of the casting 14 to communicate with an annular passageway 189 which is also in communication with the venting passageway 182, for the same purpose. Adjacent to the outlet passageway 46 there is an air bleeder screw 190 having a small port 191 which leads to a central bore 192 normally closed by a screw 193 and a lock washer 194. By the removal of the screw 194 any accumulated air may be released from the power cylinder 42. If desired, there may also be provided one or more outlets 195 and 196 which, as shown, are normally closed by screw plugs 197 and 198, for connection to a trailer or trailers having power units of any desired type, and which may be controlled in a similar way by the modulated amounts of atmospheric air admitted to vacuum chambers for the operation of pressure responsive movable walls or members for the application of power.

In the operation of the power unit, it will be understood that, initially, the control plunger 26 will be at the right hand end of its path, thus unseating the valve 22, 23, and the master diaphragm 95 will be at the right hand end of its path, also, with the vacuum valve 125, 127 open and the inlet or air valve 144, 145 closed. Therefore, when the manual pressure is applied to the pedal 1 the liquid under manual pressure in the pipe 11 will initially pass through the cut-off check valve 22, 23 into the chamber 27, thence through the passageway 41 into the power cylinder 42 and by means of the outlet 46 and pipe 50 to the brake cylinders 53, 54, 55 and 56 to set the brakes and apply a slight braking force thereto, also, if desired. When, now, further pressure is applied by the pedal 1 this will begin to move the control piston 26 to the left, thus causing the spring 29 to seat the cut-off check valve 22, 23 and, accordingly, discontinuing thereafter the direct communication of the hydraulic liquid from the master cylinder pipe 11 to the brake cylinders 53, 54, 55 and 56. Accordingly, the further application of force to the control plunger 26 will move the valve lever 75 and therefore the plate 124 so as first to seat the outlet or vacuum valve 125, 127 and, consequently, move the same into lapped position with regard to the already seated air or outlet valve 144, 145. Any slight further movement of the control plunger 26 will modulatingly admit air from the vent 149, passageway 151, passageway 156, chamber 163 and passageway 143 through the valve 144, 145 to the right face of the pressure responsive diaphragm 95, thus forcing the said diaphragm to the left and drawing with it the piston 45 on the plunger 43 in the power cylinder 42 and forcing the hydraulic liquid under power pressure through the outlet passageway 46 and brake pipe line 50 to the brake cylinders 53, 54, 55 and 56, thus applying the desired degree of modulating braking effort to the brake cylinders of the four wheels of the automobile. In a similar manner decreasing pressure may be applied to the brake cylinders 53, 54, 55 and 56, as desired, by modulatingly releasing the pressure on the pedal 1, which will act to first seat the inlet valve 144, 145 and then move the plate 124 to unseat the outlet valve 125, 127 to admit vacuum in this way through the passageway 125 to the right face of the flexible diaphragm 95, thus decreasing the braking effort. In the same way, when the pedal pressure is entirely released the parts will be restored to their intial position by releasing all of the air pressure from the right face of the diaphragm 95 and connecting both sides of said diaphragm with a source of vacuum 146. In the operation of the power unit, whenever the brakes are being operated there is a reaction or "feel" therefrom pressing on the pedal 1 in opposition to the foot, and whenever power is being applied in the operation of the brakes, this reaction is felt on the foot by means of the control plunger 26 from the valve lever 76, but the amount of this reaction is controlled to some extent by reason of the compensating diaphragm 87, which, to the extent desired, can decrease the amount of the reaction or "feel" during the application of power pressures inasmuch as the tendency of the air pressure on the right face of the diaphragm 95 acts to compress the spring 57 somewhat and to that extent to remove opposition, exerted by the force effect in the lever 76 under the influence of the pressure of the air, to the manual force being used for the application of the power pressures. When the spring 57 thus becomes depressed the plunger 67, owing to its support by the spring 65, still maintains continuity between the valve lever 76 and the plunger 26 by keeping the ends of the pin 68 of the plunger 67 in contact with the ring 72 which is on the diaphragm plate 63.

It will be noted, also, that the power unit is so constructed as to require a minimum of labor in making and assembling the same, especially as the two plungers 43 and 26 can be assembled together with the valve mechanism mounted on the plate 63, and can, in fact, be inserted as an assembly into the housing or casting 14 and then secured in place with the diaphragm 95 clamped between the diaphragm casing members 98 and 99.

While I have described my invention above in detail I wish it to be understood that many changes may be made therein without departing from the spirit of the same.

I claim:

1. A power unit comprising an inlet for fluid pressure differing from the atmospheric pressure, a movable member responsive to said pressure, a casing for said member, a fluid pressure intensifying plunger connected to said member by a hollow rod, a chamber for said plunger, control means for controlling the application of said pressure to said member, valve means operated by said control means for applying said fluid pressure to said member, an air vent, on the opposite side of the movable member from said inlet, leading to said movable member through said hollow rod, and separable plates on said member forming with said hollow rod an air passageway leading from said air vent to said valve means.

2. A power unit comprising an inlet for fluid pressure differing from the atmospheric pressure, a movable member responsive to said pressure, a casing for said member, a fluid pressure intensifying plunger connected to said member by a hollow rod, a chamber for said plunger, control means for controlling the application of said pressure to said member, valve means on said movable member operated by said control means for applying said fluid pressure to said member, an air vent, on the opposite side of the movable member from said inlet, leading to said movable member through said hollow rod, and separable plates on said member forming with said hollow rod an air passageway leading from said air vent to said valve means.

3. A power unit comprising an inlet for fluid pressure differing from the atmospheric pressure, a movable member responsive to said pressure, a casing for said member, a fluid pressure intensifying plunger connected to said member by a hollow rod, a chamber for said plunger, control means for controlling the application of said pressure to said member, valve means on said movable member, having a vacuum valve and an air valve, operated by said control means for applying said fluid pressure to said member, an air vent, on the opposite side of the movable member from said inlet, leading to said movable member through said hollow rod, and separable plates on said member forming with said hollow rod an air passageway leading through said air vent to said valve means.

4. A power unit comprising an inlet for fluid pressure differing from the atmospheric pressure, a movable member responsive to said pressure, a casing for said member, a fluid pressure intensifying plunger connected to said member by a hollow rod, a chamber for said plunger, control means for controlling the application of said pressure to said member, valve means operated by said control means for applying said fluid pressure to said member, an air vent, on the opposite side of the movable member from said inlet, leading to said movable member through said hollow rod, and separable plates on said member forming with said hollow rod an air passageway leading through said air vent to said valve means, said movable member comprising a flexible diaphragm mounted on one of said plates.

5. A power unit comprising an inlet for fluid pressure differing from the atmospheric pressure, a movable member responsive to said pressure, a casing for said member, a fluid pressure intensifying plunger connected to said member by a hollow rod, a chamber for said plunger, control means for controlling the application of said pressure to said member, valve means on said movable member operated by said control means for applying said fluid pressure to said member, an air vent, on the opposite side of the movable member from said inlet, leading to said movable member through said hollow rod, and separable plates on said member forming with said hollow rod an air passageway leading through said air vent to said valve means, said movable member comprising a flexible diaphragm mounted on one of said plates.

6. A power unit comprising an inlet for fluid pressure differing from the atmospheric pressure, a movable member responsive to said pressure, a casing for said member, a fluid pressure intensifying plunger connected to said member by a hollow rod, a chamber for said plunger, control means for controlling the application of said pressure to said member, valve means on said movable member, having a vacuum valve and an air valve, operated by said control means for applying said fluid pressure to said member, an air vent, on the opposite side of the movable member from said inlet, leading to said movable member through said hollow rod, and separable plates on said member forming with said hollow rod an air passageway leading from said air vent to said valve means, said movable member comprising a flexible diaphragm mounted on one of said plates.

7. A power unit comprising an inlet for fluid pressure differing from the atmospheric pressure, a movable member responsive to said pressure, a casing for said member, control means for controlling the application of said pressure to said member, valve means operated by said control means for applying said fluid pressure to said member, an air vent leading to said movable member, and plates on said member forming an air passageway leading to said valve means, said control means comprising a valve operating lever and a flexible diaphragm subsidiary to the movable member, connected to the valve lever.

8. A power unit comprising an inlet for fluid pressure differing from the atmospheric pressure, a movable member responsive to said pressure, a casing for said member, control means for controlling the application of said pressure to said member, valve means on said movable member operated by said control means for applying said fluid pressure to said member, an air vent leading to said movable member, and plates on said member forming an air passageway leading to said valve means, said control means comprising a valve operating lever and a flexible diaphragm subsidiary to the movable member, connected to the valve lever.

9. A power unit comprising an inlet for fluid pressure differing from the atmospheric pressure, a movable member responsive to said pressure, a casing for said member, control means for controlling the application of said pressure to said member, valve means on said movable member, having a vacuum valve and an air valve, operated by said control means for applying said fluid pressure to said member, an air vent leading to said movable member, and plates on said member forming an air passageway leading to said valve means, said control means comprising a valve operating lever and a flexible diaphragm subsidiary to the movable member, connected to the valve lever.

10. A power unit comprising an inlet for fluid pressure differing from the atmospheric pressure, a movable member responsive to said pressure, a casing for said member, control means for controlling the application of said pressure to said member, valve means operated by said control means for applying said fluid pressure to said member, an air vent leading to said movable member, a valve operating means between the control means and the valve means, said valve operating means having a reaction-varying plunger mounted for relative movement thereto on said pressure responsive member, a spring between the valve operating means and said member, and a spring between the control means and said movable member.

11. A power unit comprising an inlet for fluid pressure differing from the atmospheric pressure, a movable member responsive to said pressure, a casing for said member, control means for controlling the application of said pressure to said member, valve means on said movable member operated by said control means for applying said fluid pressure to said member, an air vent leading to said member, a valve operating means between the control means and the valve means, said valve operating means having a reaction-varying plunger mounted for relative movement thereto on said pressure responsive member, a spring between the valve operating means and said member, and a spring between the control means and said movable member.

12. A power unit comprising an inlet for fluid pressure differing from the atmospheric pressure, a movable member responsive to said pressure, a casing for said member, control means for controlling the application of said pressure to said member, valve means operated by said control means for applying said fluid pressure to said member, an air vent leading to said movable member, a valve operating lever pivoted on said movable member, a spring connection between the movable member and the control means, and a pressure compensating connection to decrease the reaction on the valve lever from said movable member.

13. A power unit comprising an inlet for fluid pressure differing from the atmospheric pressure, a movable member responsive to said pressure, a casing for said member, control means for controlling the application of said pressure to said member, control means on said movable member operated by said control means for applying said fluid pressure to said member, an air vent leading to said movable member, a valve operating lever pivoted on said movable member, a spring connection between the movable member and the control means, and a pressure compensating connection to decrease the reaction on the valve lever from said movable member.

14. A power unit comprising an inlet for fluid pressure differing from the atmospheric pressure, a movable member, in the form of a flexible diaphragm, responsive to said pressure, a casing for said member, control means for controlling the application of said pressure to said member, valve means operated by said control means for applying said fluid pressure to said member, an air vent leading to said movable member, a valve operating means between the control means and the valve means, said valve operating means having a reaction-varying plunger, in the form of a diaphragm, mounted for relative movement thereto on said pressure responsive member, a spring between the valve operating means and said member, and a spring between the control means and said member.

15. A power unit comprising an inlet for fluid pressure differing from the atmospheric pressure, a movable member, in the form of a flexible diaphragm, responsive to said pressure, a casing for said member, control means for controlling the application of said pressure to said member, valve means on said movable member operated by said control means for applying said fluid pressure to said member, an air vent leading to said member, a valve operating means between the control means and the valve means, said valve operating means having a reaction-varying plunger, in the form of a diaphragm, mounted for relative movement thereto on said pressure responsive member, and a spring between the valve operating means and said member, and a spring between the control means and said member.

16. A power unit comprising an inlet for fluid pressure differing from the atmosphere, an inlet for atmospheric air, a movable member responsive to said fluid pressure, an enclosure having a chamber for said member, a pressure increasing plunger connected to said member, a control plunger for controlling the application of said fluid pressure to said member, said control plunger having a liquid compensation valve movable within the control plunger and a valve seating spring located between the valve and the control plunger, valve means controlled by the control plunger and mounted on the movable member for applying said fluid pressure to move said member, and a casing for said plungers having a hydraulic inlet for said liquid, opened by the retraction of the control plunger when the compensation valve is moved to open position by the casing, and a hydraulic outlet for said liquid, said plungers, movable member, compensation valve and valve means forming an assembly for insertion of the plungers together into said casing.

17. A power unit comprising an inlet for fluid pressure differing from the atmosphere, an inlet for atmospheric air, a movable member responsive to said fluid pressure, an enclosure having a chamber for said member, a pressure increasing plunger connected to said member, a control plunger for controlling the application of said fluid pressure to said member, said control plunger having a liquid compensation valve movable within the control plunger and a valve seating spring located between the valve and the control plunger, a valve means controlled by the control plunger and mounted on the movable member for applying said fluid pressure to move said member, and a casing for said plungers having a hydraulic inlet for said liquid, opened by the retraction of the control plunger when the compensation valve is moved to open position by the casing, and a hydraulic outlet for said liquid, said plungers, movable member, compensation valve and valve means forming an assembly for insertion of the plungers together into said casing by insertion of the plungers first into said casing and then enclosing the movable member and valve means in said chamber.

18. A power unit comprising an inlet for fluid pressure differing from the atmosphere, an inlet for atmospheric air, a movable member, having a rigid plate, responsive to said fluid pressure, an enclosure having a chamber for said member, a pressure increasing plunger connected to said member, a control plunger for controlling the application of said fluid pressure to said member, said control plunger having a liquid compensation valve movable within the control plunger and a valve seating spring located between the valve and the control plunger, valve means controlled by the control plunger and yieldingly mounted on the plate for applying said fluid pressure to move said member, and a casing for said plungers having a hydraulic inlet for said liquid, opened by the retraction of the control plunger when the compensation valve is moved to open position by the casing, and a hydraulic outlet for the said liquid, said plungers, plate, compensation valve and valve means forming an assembly for insertion of the plungers together into said casing.

19. A power unit comprising an inlet for fluid pressure differing from the atmosphere, an inlet for atmospheric air, a movable member, having a rigid plate, responsive to said fluid pressure, an enclosure having a chamber for said member, a pressure increasing plunger connected to said member, a control plunger for controlling the application of said fluid pressure to said member, said control plunger having a liquid compensation valve movable within the control plunger and a valve seating spring located between the valve and the control plunger, valve means controlled by the control plunger and yieldingly mounted on the plate for applying said fluid pressure to move said member, and a casing for said plungers having a hydraulic inlet for said liquid, opened by the retraction of the control plunger when the compensation valve is moved to open position by the casing, and a hydraulic outlet for the said liquid, said plungers, plate, compensation valve and valve means forming an assembly for insertion of the plungers together into said casing by insertion of the plungers first into said casing and then enclosing the movable member and valve means in said chamber.

EDWARD A. ROCKWELL.

REFERENCES CITED

The following references are of record in the file of this patent:

UNITED STATES PATENTS

| Number | Name | Date |
|---|---|---|
| 1,927,942 | Lobez | Sept. 26, 1933 |
| 2,365,960 | Ingres | Dec. 26, 1944 |
| 2,377,699 | Klimkiewicz | June 5, 1945 |
| 2,388,220 | Rockwell | Oct. 30, 1945 |
| 2,398,252 | Rockwell | Apr. 9, 1946 |
| 2,401,892 | Stelzer | June 11, 1946 |
| 2,532,960 | Stelzer | Dec. 5, 1950 |